US012801846B2

(12) United States Patent
Yoon et al.

(10) Patent No.: US 12,801,846 B2
(45) Date of Patent: Nov. 17, 2026

(54) SEMI-SUPERVISED ANOMALY DETECTION UNDER DISTRIBUTION MISMATCH

(71) Applicant: Google LLC, Mountain View, CA (US)

(72) Inventors: Jinsung Yoon, San Jose, CA (US); Kihyuk Sohn, Mountain View, CA (US); Chun-Liang Li, Mountain View, CA (US); Sercan Omer Arik, San Francisco, CA (US)

(73) Assignee: Google LLC, Mountain View, CA (US)

( * ) Notice: Subject to any disclaimer, the term of this patent is extended or adjusted under 35 U.S.C. 154(b) by 837 days.

(21) Appl. No.: 18/150,277

(22) Filed: Jan. 5, 2023

(65) Prior Publication Data

US 2023/0237260 A1 Jul. 27, 2023

Related U.S. Application Data

(60) Provisional application No. 63/303,294, filed on Jan. 26, 2022.

(51) Int. Cl.
*G06N 5/02* (2023.01)
*G06F 40/216* (2020.01)
*G06N 5/022* (2023.01)

(52) U.S. Cl.
CPC ........... *G06F 40/216* (2020.01); *G06N 5/022* (2013.01)

(58) Field of Classification Search
CPC ...................................................... G06N 5/022
See application file for complete search history.

(56) References Cited

PUBLICATIONS

Dinghai Wu, "Research on abnormal detection of one-class support vector machine based on ensemble cooperative semi-supervised learning" (Year: 2019).*
Zhang, "Probabilistic-Mismatch Anomaly Detection: Do one's Medications Match with the Diagnoses?" (Year: 2016).*
Song, "Self-Supervised Anomaly Detection for In-Vehicle Network Using Noised Pseudo Normal Data" (Year: 2021).*
Park, "What is Wrong With One-Class Anomaly Detection" (Year: 2021).*
Huang et al. Transfer Log-based Anomaly Detection with Pseudo Labels. 2020 16th International Conference on Network and Service Management (CNSM), IFIP, Nov. 2, 2020 (Nov. 2, 2020), pp. 1-5, DOI: 10.23919/CNSM50824.2020.9269069.
International Search Report and Written Opinion for International Application No. PCT/US2023/010987 dated Apr. 13, 2023. 17 pages.
Saito et al. Asymmetric Tri-training for Unsupervised Domain Adaptation. arxiv.org, May 13, 2017 (May 13, 2017), pp. 1-12, Retrieved from the Internet: <https://arxiv.org/pdf/1702.08400.pdf>.

(Continued)

*Primary Examiner* — Van C Mang
(74) *Attorney, Agent, or Firm* — Lerner David LLP

(57) ABSTRACT

Aspects of the disclosure are directed to a Semi-supervised Pseudo-labeler Anomaly Detection with Ensembling (SPADE) framework that is not limited by the assumption that labeled and unlabeled data come from the same distribution. SPADE utilizes an ensemble of one-class classifiers as the pseudo-labeler to improve the robustness of pseudo-labeling with distribution mismatch. Partial matching automatically selects critical hyper-parameters for pseudo-labeling without validation data, which is crucial with a limited amount of labeled data.

20 Claims, 11 Drawing Sheets

(56) References Cited

PUBLICATIONS

Saito et al. OpenMatch: Open-set Consistency Regularization for Semi-supervised Learning with Outliers. arxiv.org, Cornell University Library, 201 Olin Library Cornell University Ithaca, NY 14853, Aug. 24, 2021 (Aug. 24, 2021), 17 pages.
Yoon et al. Self-Trained One-class Classification for Unsupervised Anomaly Detection. arxiv.org, Cornell University Library, 201 Olin Library Cornell University Ithaca, NY 14853, Jun. 11, 2021 (Jun. 11, 2021), 17 pages.
Mahsa Baktashmotlagh, Mehrtash T Harandi, Brian C Lovell, and Mathieu Salzmann. Unsupervised domain adaptation by domain invariant projection. In Proceedings of the IEEE International Conference on Computer Vision, pp. 769-776, 2013.
Jessa Bekker and Jesse Davis. Learning from positive and unlabeled data: A survey. Machine Learning, 109 (4):719-760, 2020.
Sneha Chaudhari and Shirish Shevade. Learning from positive and unlabelled examples using maximum margin clustering. In International Conference on Neural Information Processing, pp. 465-473. Springer, 2012.
Ting Chen, Simon Kornblith, Mohammad Norouzi, and Geoffrey Hinton. A simple framework for contrastive learning of visual representations. In International conference on machine learning, pp. 1597-1607. PMLR, 2020a.
Yanbei Chen, Xiatian Zhu, Wei Li, and Shaogang Gong. Semi-supervised learning under class distribution mismatch. In Proceedings of the AAAI Conference on Artificial Intelligence, vol. 34, pp. 3569-3576, 2020b.
Marthinus Christoffel, Gang Niu, and Masashi Sugiyama. Class-prior estimation for learning from positive and unlabeled data. In Asian Conference on Machine Learning, pp. 221-236. PMLR, 2016.
Charles Elkan and Keith Noto. Learning classifiers from only positive and unlabeled data. In Proceedings of the 14th ACM SIGKDD international conference on Knowledge discovery and data mining, pp. 213-220, 2008.
Jean-Bastien Grill, Florian Strub, Florent Altché, Corentin Tallec, Pierre H Richemond, Elena Buchatskaya, Carl Doersch, Bernardo Avila Pires, Zhaohan Daniel Guo, Mohammad Gheshlaghi Azar, et al. Bootstrap your own latent: A new approach to self-supervised learning. arXiv preprint arXiv:2006.07733, 2020. 35 pages.
Fengxiang He, Tongliang Liu, Geoffrey I Webb, and Dacheng Tao. Instance-dependent pu learning by bayesian optimal relabeling. arXiv preprint arXiv:1808.02180, 2018. 27 pages.
Jaehyung Kim, Youngbum Hur, Sejun Park, Eunho Yang, Sung Ju Hwang, and Jinwoo Shin. Distribution aligning refinery of pseudo-label for imbalanced semi-supervised learning. arXiv preprint arXiv:2007.08844, 2020. 19 pages.
Dong-Hyun Lee. Pseudo-label: The simple and efficient semi-supervised learning method for deep neural networks. In Workshop on challenges in representation learning, ICML, vol. 3, 2013, 7 pages.
Fei Tony Liu, Kai Ming Ting, and Zhi-Hua Zhou. Isolation forest. In ICDM, 2008, 10 pages.
Mingsheng Long, Han Zhu, Jianmin Wang, and Michael I Jordan. Unsupervised domain adaptation with residual transfer networks. arXiv preprint arXiv:1602.04433, 2016, 10 pages.
Fantine Mordelet and J-P Vert. A bagging svm to learn from positive and unlabeled examples. Pattern Recognition Letters, 37:201-209, 2014. 15 pages.
Guansong Pang, Chunhua Shen, and Anton van den Hengel. Deep anomaly detection with deviation networks. In Proceedings of the 25th ACM SIGKDD international conference on knowledge discovery & data mining, pp. 353-362, 2019.
Guansong Pang, Anton van den Hengel, Chunhua Shen, and Longbing Cao. Toward deep supervised anomaly detection: Reinforcement learning from partially labeled anomaly data. In Proceedings of the 27th ACM SIGKDD Conference on Knowledge Discovery & Data Mining, pp. 1298-1308, 2021.
Lukas Ruff, Robert A Vandermeulen, Nico Görnitz, Alexander Binder, Emmanuel Müller, Klaus-Robert Müller, and Marius Kloft. Deep semi-supervised anomaly detection. In ICLR, 2020. 23 pages.
Kuniaki Saito, Donghyun Kim, and Kate Saenko. Openmatch: Open-set semi-supervised learning with open-set consistency regularization. Advances in Neural Information Processing Systems, 34, 2021. 12 pages.
Sundararajan Sellamanickam, Priyanka Garg, and Sathiya Keerthi Selvaraj. A pairwise ranking based approach to learning with positive and unlabeled examples. In Proceedings of the 20th ACM international conference on Information and knowledge management, pp. 663-672, 2011.
Kihyuk Sohn, David Berthelot, Nicholas Carlini, Zizhao Zhang, Han Zhang, Colin A Raffel, Ekin Dogus Cubuk, Alexey Kurakin, and Chun-Liang Li. Fixmatch: Simplifying semi-supervised learning with consistency and confidence. NeurIPS, 2020. 21 pages.
Yu Sun, Eric Tzeng, Trevor Darrell, and Alexei A Efros. Unsupervised domain adaptation through selfsupervision. arXiv preprint arXiv:1909.11825, 2019. 15 pages.
Jinsung Yoon, Yao Zhang, James Jordon, and Mihaela van der Schaar. Vime: Extending the success of self-and semi-supervised learning to tabular domain. Advances in Neural Information Processing Systems, 33, 2020. 11 pages.
Bangzuo Zhang and Wanli Zuo. Learning from positive and unlabeled examples: A survey. In 2008 International Symposiums on Information Processing, 2008, 5 pages.

* cited by examiner

| Datasets | Thyroid | | | Drug | | | Covertype | | |
|---|---|---|---|---|---|---|---|---|---|
| Metrics (AUC) | Overall | Given | Missed | Overall | Given | Missed | Overall | Given | Missed |
| Supervised | 0.815 | 0.996 | 0.741 | 0.818 | 0.810 | 0.833 | 0.858 | **0.988** | 0.693 |
| Negative Supervised | 0.622 | 0.837 | 0.533 | 0.676 | 0.670 | 0.685 | 0.761 | 0.881 | 0.610 |
| OCC | 0.711 | 0.876 | 0.643 | 0.741 | 0.727 | 0.765 | 0.897 | 0.910 | 0.880 |
| Negative OCC | 0.446 | 0.637 | 0.367 | 0.731 | 0.700 | 0.780 | 0.825 | 0.832 | 0.815 |
| Unsupervised OCC | 0.429 | 0.612 | 0.353 | 0.769 | 0.747 | 0.803 | 0.843 | 0.853 | 0.831 |
| VIME | 0.592 | 0.724 | 0.538 | 0.792 | 0.777 | 0.820 | 0.837 | 0.967 | 0.672 |
| DANN | 0.725 | 0.876 | 0.662 | 0.744 | 0.730 | 0.768 | 0.791 | 0.979 | 0.552 |
| SPADE | **0.921** | **0.997** | **0.891** | **0.837** | **0.831** | **0.849** | **0.928** | 0.957 | **0.892** |

| Scenarios | New anomalies | | Easiness | |
|---|---|---|---|---|
| Datasets | MVTec | Magnetic | MVTec | Magnetic |
| Supervised | 84.3 | 82.3 | 90.9 | 81.7 |
| Negative Supervised | 76.5 | 63.5 | 79.2 | 59.3 |
| Negative OCC | 81.3 | 69.0 | 87.6 | 70.1 |
| Unsupervised OCC | 85.4 | 72.2 | 88.4 | 73.1 |
| FixMatch | 81.4 | 69.1 | 83.5 | 70.8 |
| SPADE | **87.9** | **85.2** | **92.1** | **83.9** |

FIG. 7

| Datasets | Thyroid | Drug | Covertype |
|---|---|---|---|
| Supervised | 0.805 | **0.848** | 0.878 |
| Negative Supervised | 0.626 | 0.701 | 0.599 |
| OCC | 0.787 | 0.838 | 0.888 |
| Negative OCC | 0.464 | 0.741 | 0.826 |
| Unsupervised OCC | 0.484 | 0.786 | 0.846 |
| VIME | 0.728 | 0.849 | 0.843 |
| DANN | 0.731 | 0.754 | 0.835 |
| SPADE | **0.833** | 0.846 | **0.892** |

FIG. 8

| Datasets | Thyroid | | | Drug | | | Covertype | | |
|---|---|---|---|---|---|---|---|---|---|
| Metrics (AUC) | Overall | Given | Missed | Overall | Given | Missed | Overall | Given | Missed |
| Negative Supervised | 0.786 | **0.997** | 0.698 | 0.839 | 0.839 | **0.840** | 0.846 | **0.996** | 0.657 |
| Negative OCC | 0.470 | 0.695 | 0.377 | 0.739 | 0.709 | 0.787 | 0.849 | 0.864 | 0.831 |
| Unsupervised OCC | 0.519 | 0.707 | 0.441 | 0.771 | 0.748 | 0.809 | 0.863 | 0.880 | 0.842 |
| Weighted Elkanoto | 0.772 | 0.934 | 0.705 | 0.711 | 0.714 | 0.706 | 0.699 | 0.917 | 0.422 |
| BaggingPU | 0.787 | 0.964 | 0.714 | 0.734 | 0.740 | 0.724 | 0.726 | 0.907 | 0.497 |
| SPADE | **0.929** | 0.996 | **0.901** | **0.840** | **0.842** | 0.837 | **0.896** | 0.940 | **0.839** |

FIG. 9

| Datasets | Kaggle Credit Fraud | | Xente Fraud | |
|---|---|---|---|---|
| Labeling ratio | 5% | 10% | 10% | 20% |
| Supervised | 0.975 | 0.977 | 0.906 | 0.925 |
| Negative Supervised | 0.971 | 0.976 | 0.909 | 0.918 |
| OCC | 0.717 | 0.803 | 0.891 | 0.920 |
| Negative OCC | 0.838 | 0.835 | 0.608 | 0.630 |
| Unsupervised OCC | 0.897 | 0.897 | 0.806 | 0.912 |
| VIME | 0.941 | 0.943 | 0.859 | 0.893 |
| DANN | 0.921 | 0.922 | 0.798 | 0.822 |
| SPADE | **0.982** | **0.983** | **0.920** | **0.931** |

FIG. 10

SEMI-SUPERVISED ANOMALY DETECTION UNDER DISTRIBUTION MISMATCH

CROSS-REFERENCE TO RELATED APPLICATIONS

The present application claims the benefit of the filing date of U.S. Provisional Patent Application No. 63/303,294, filed Jan. 26, 2022, the disclosure of which is hereby incorporated herein by reference.

BACKGROUND

Anomaly detection is the task of distinguishing anomalies from normal data, typically with use of a machine learning model. Anomaly detection has a variety of different real-world applications, such as in manufacturing to detect faults in manufactured products; in financial analysis to monitor financial transactions for potentially fraudulent activity; and in healthcare data analysis to identify diseases or other harmful conditions in a patient. There are multiple settings that anomaly detection is considered.

One scenario is a fully supervised setting, where labels for all samples are available, for both normal and anomalous samples. This setting is typically addressed with specialized approaches for data imbalance, such as weighted loss functions or resampling methods. A special case of this fully supervised setting is where only labeled normal samples are available. One-class classifiers (OCCs), such as support vector machines (SVM) or auto-encoder, and isolation detection, such as Isolation Forest, are approaches for this special case. Despite being widely studied, these scenarios have a tedious labeling requirement in real-world applications.

Another scenario is an unsupervised setting, without any labeled data. Various methods have been proposed for this setting. While the labeling costs can be entirely eliminated, performance degradation is often significant compared to the supervised setting, limiting the reliability for real world application.

Yet another scenario is a semi-supervised setting for anomaly detection that aims to achieve high performance with a limited amount of labeling data. Methods for the semi-supervised setting include focusing on a positive-unlabeled setting or utilizing OCCs or adversarial training on semi-supervised learning that treats all unlabeled data as normal samples. Most semi-supervised learning methods assume that the labeled and unlabeled data come from the same distributions. More specifically, the subsets of the data are labeled such that sampling from the unlabeled data is randomly uniform. However, in practice, this assumption often does not hold as distribution mismatch commonly occurs, with labeled and unlabeled data coming from different distributions.

Some methods consider distribution mismatch in a limited setting where only the label distributions are different, such as the anomalous ratio is 10% for training but 50% for testing. However, more general real-world scenarios can commonly include positive and unlabeled (PU) or negative and unlabeled (NU) settings, where the distributions between labeled, either positive or negative, and unlabeled, both positive and negative, samples are different. Further, additional unlabeled data can be gathered after labeling, causing distribution shift. For example, manufacturing processes may keep evolving and thus, the corresponding defects can change and the defect types at labeling differ from the defect types in unlabeled data. In addition, for financial fraud detection and anti-money laundering applications, new anomalies can appear after the data labeling process, as the criminals themselves adapt. Lastly, human labelers are more confident on easy samples; thus, easy samples are more likely to be included in the labeled data and difficult samples are more likely to be included in the unlabeled data. For example, with some crowd-sourcing-based labeling tools, only the samples with some consensus on the labels, as a measure of confidence, are included in the labeled set.

Semi-supervised learning methods are sub-optimal for anomaly detection under distribution mismatch because they are developed with the assumption that labeled and unlabeled data come from the same distribution. Generated pseudo-labels are highly dependent on a small set of labeled data; thus, the trained semi-supervised models would be biased on the labeled data distribution. Transfer learning methods or the frameworks for distribution shifts may constitute alternatives by treating source/target data as labeled/unlabeled data. However, these alternatives have not been effective with a small number of labeled samples.

BRIEF SUMMARY

Aspects of the disclosure are directed to a semi-supervised anomaly detection framework to achieve high performance with limited labeling budget. The semi-supervised anomaly detection framework yields robust performance even in the presence of distribution mismatch, such as when labeled and unlabeled data come from different distributions. An ensemble of one-class classifiers is used for pseudo-labeling to reduce dependence from a limited amount of labeled data. A predictor is trained with both a small amount of labeled data and pseudo-labeled samples. Partial distribution matching is utilized to automatically determine critical hyper-parameters for the pseudo-labeled samples.

An aspect of the disclosure provides for a method for anomaly detection. The method includes: receiving, by one or more processors, unlabeled data; determining, by the one or more processors, pseudo labels for the unlabeled data using a plurality of one-class classifiers; assigning, by the one or more processors, the pseudo labels to the unlabeled data to generate pseudo labeled data; and training, by the one or more processors, a machine learning model to detect network anomalies using the pseudo labeled data.

In an example, each of the one-class classifiers are trained with negatively labeled data and a disjoint subset of unlabeled data. In another example, determining the pseudo labels further includes determining a positive pseudo label when a threshold amount of the one-class classifiers agree to assign the positive pseudo label. In yet another example, determining the pseudo labels further includes determining a negative pseudo label when a threshold amount of the one-class classifiers agree to assign the negative pseudo label. In yet another example, determining the pseudo label further includes determining an unlabeled label when a threshold amount of one-class classifiers do not agree whether to assign positive or negative pseudo labels.

In yet another example, the method further includes receiving, by the one or more processors, labeled data. In yet another example, training the machine learning model further includes training the machine learning model to detect network anomalies using the labeled data.

In yet another example, determining the pseudo labels further includes matching a distribution of anomaly scores of positively labeled data to anomaly scores of the unlabeled data and estimating a positive marginal distribution. In yet another example, determining the pseudo labels further includes matching a distribution of anomaly scores of negatively labeled data to anomaly scores of the unlabeled data and estimating a negative marginal distribution.

In yet another example, training the machine learning model further comprises using binary cross entropy on the pseudo labeled data.

Another aspect of the disclosure provides for a system including: one or more processors; and one or more storage devices coupled to the one or more processors and storing instructions that, when executed by the one or more processors, cause the one or more processors to perform operations for anomaly detection. The operations include: receiving unlabeled data; determining pseudo labels for the unlabeled data using a plurality of one-class classifiers; assigning the pseudo labels to the unlabeled data to generate pseudo labeled data; and training a machine learning model to detect network anomalies using the pseudo labeled data.

In an example, each of the one-class classifiers are trained with negatively labeled data and a disjoint subset of unlabeled data; and determining the pseudo labels further includes: determining a positive pseudo label when a threshold amount of the one-class classifiers agree to assign the positive pseudo label; determining a negative pseudo label when a threshold amount of the one-class classifiers agree to assign the negative pseudo label; and determining an unlabeled label when a threshold amount of one-class classifiers do not agree whether to assign positive or negative pseudo labels.

In another example, the operations further include receiving labeled data; and training the machine learning model further includes training the machine learning model to detect network anomalies using the labeled data.

In yet another example, determining the pseudo labels further includes: matching a distribution of anomaly scores of positively labeled data to anomaly scores of the unlabeled data and estimating a positive marginal distribution; and matching a distribution of anomaly scores of negatively labeled data to anomaly scores of the unlabeled data and estimating a negative marginal distribution.

In yet another example, training the machine learning model further comprises using binary cross entropy on the pseudo labeled data.

Yet another aspect of the disclosure provides for a non-transitory computer readable medium for storing instructions that, when executed by one or more processors, cause the one or more processors to perform operations for anomaly detection. The operations include: receiving unlabeled data; determining pseudo labels for the unlabeled data using a plurality of one-class classifiers; assigning the pseudo labels to the unlabeled data to generate pseudo labeled data; and training a machine learning model to detect network anomalies using the pseudo labeled data.

In an example, each of the one-class classifiers are trained with negatively labeled data and a disjoint subset of unlabeled data; and determining the pseudo labels further includes: determining a positive pseudo label when a threshold amount of the one-class classifiers agree to assign the positive pseudo label; determining a negative pseudo label when a threshold amount of the one-class classifiers agree to assign the negative pseudo label; and determining an unlabeled label when a threshold amount of one-class classifiers do not agree whether to assign positive or negative pseudo labels.

In another example, the operations further include receiving labeled data; and training the machine learning model further includes training the machine learning model to detect network anomalies using the labeled data.

In yet another example, determining the pseudo labels further includes: matching a distribution of anomaly scores of positively labeled data to anomaly scores of the unlabeled data and estimating a positive marginal distribution; and matching a distribution of anomaly scores of negatively labeled data to anomaly scores of the unlabeled data and estimating a negative marginal distribution.

In yet another example, training the machine learning model further includes using binary cross entropy on the pseudo labeled data.

BRIEF DESCRIPTION OF THE DRAWINGS

FIG. 7 depicts tables of results with new types of anomalies scenarios according to aspects of the disclosure.

FIG. 8 depicts a table of results with labeling based on easiness of samples according to aspects of the disclosure.

FIG. 9 depicts a table of results with PU settings on tabular datasets according to aspects of the disclosure.

FIG. 10 depicts a table of results on real-world fraud detection datasets according to aspects of the disclosure.

DETAILED DESCRIPTION

Generally disclosed herein are implementations for a semi-supervised anomaly detection framework, SPADE, that yields strong and robust performance even under distribution mismatch. SPADE introduces a pseudo-labeling mechanism using an ensemble of OCCs and a method for combining supervised and self-supervised learning. SPADE reduces the dependence on the labeled data as the predictors are trained with a small number of labeled and pseudo-labeled samples. SPADE includes using a partial matching method to pick hyperparameters without a validation set, which is advantageous as validation sets are often unavailable in real-world applications with limited labeled data.

SPADE significantly improves Area under the Curve (AUC) measurements in real-world scenarios, such as those utilizing tabular data or image data. SPADE also consistently outperforms existing methods in fraud detection with distribution shifts over time due to the adversarial nature of the real-world application.

For semi-supervised anomaly detection with distribution mismatch, consider given labeled training data $$D^l = \{(x_i^l, y_i^l)\}_{i=1}^{N_l}$$

and unlabeled training data $$D^u = \{x_j^u\}_{i=1}^{N_u} \cdot x^l \sim P_X^l$$

and $$x^u \sim P_X^u$$

are feature vectors and $$P_X^l$$

and $$P_X^u$$

are corresponding feature distributions of the labeled and unlabeled data, respectively. For anomaly detection, the labels $y \in Y$ are either normal (0) or anomalous (1) and there can be far more normal examples than anomalous examples, e.g., $P(y=0) >> P(y=1)$. Here, labeled and unlabeled data can come from the same distribution, e.g., $$P_X^l = P_X^u,$$

or from different distributions, e.g., $$P_X^l \neq P_X^u.$$

For example, labeled data can only include anomalous samples while unlabeled data can have both anomalous and normal samples. As another example, an anomaly can be a new type not yet in the labeled data. As yet another example, labeled data can include "easy-to-label" samples while unlabeled data can include "hard-to-label" samples. Easy to label samples can correspond to samples where there is a consensus on how to label the sample while hard to label samples can correspond to samples where there is disagreement on how to label the sample. Samples located farther from a decision boundary can be considered easy to label samples. If new anomaly types are included in unlabeled data, then $$P_X^u$$

would be different from $$P_X^l.$$

The labels y can be determined by an unknown function $f^*: X \rightarrow Y$ where $x^1, x^u \in X$. SPADE can construct an anomaly detection model $f: X \rightarrow Y$ that can minimize test loss $L(f(x), y)$ in the union of $$P_X^l$$

and $$P_X^u.$$

Figure 1:
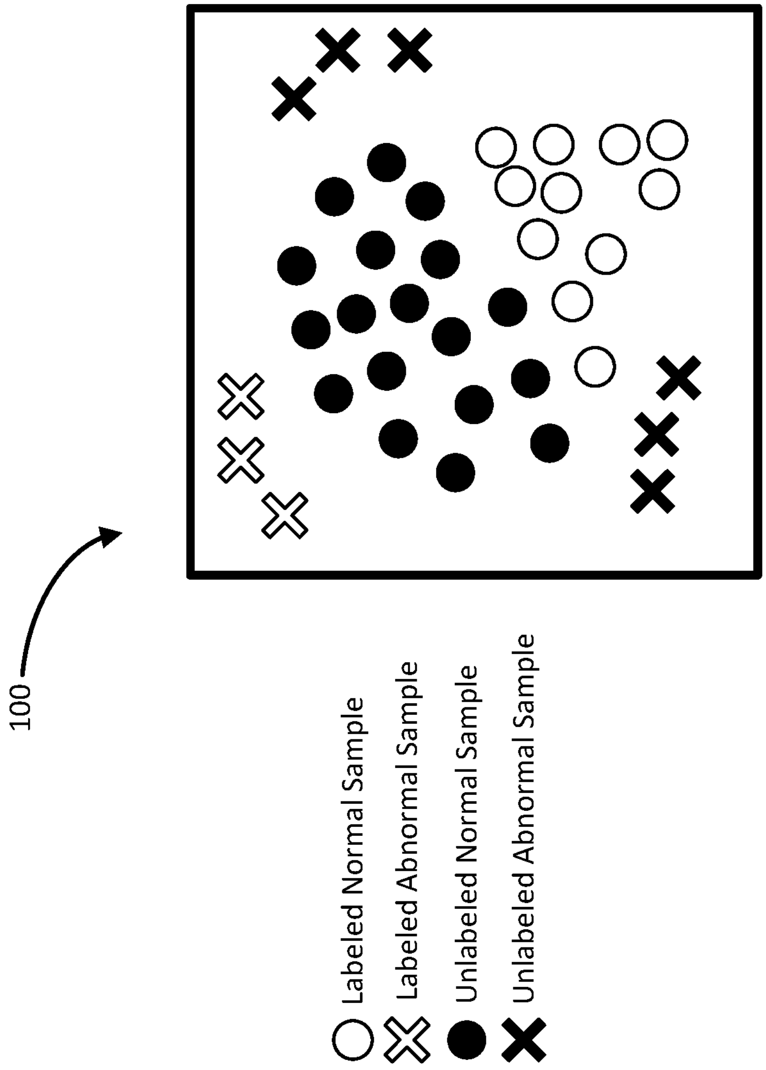
FIG. 1 depicts an example data distribution where labeled and unlabeled data distributions are different according to aspects of the disclosure.
Figure 2:
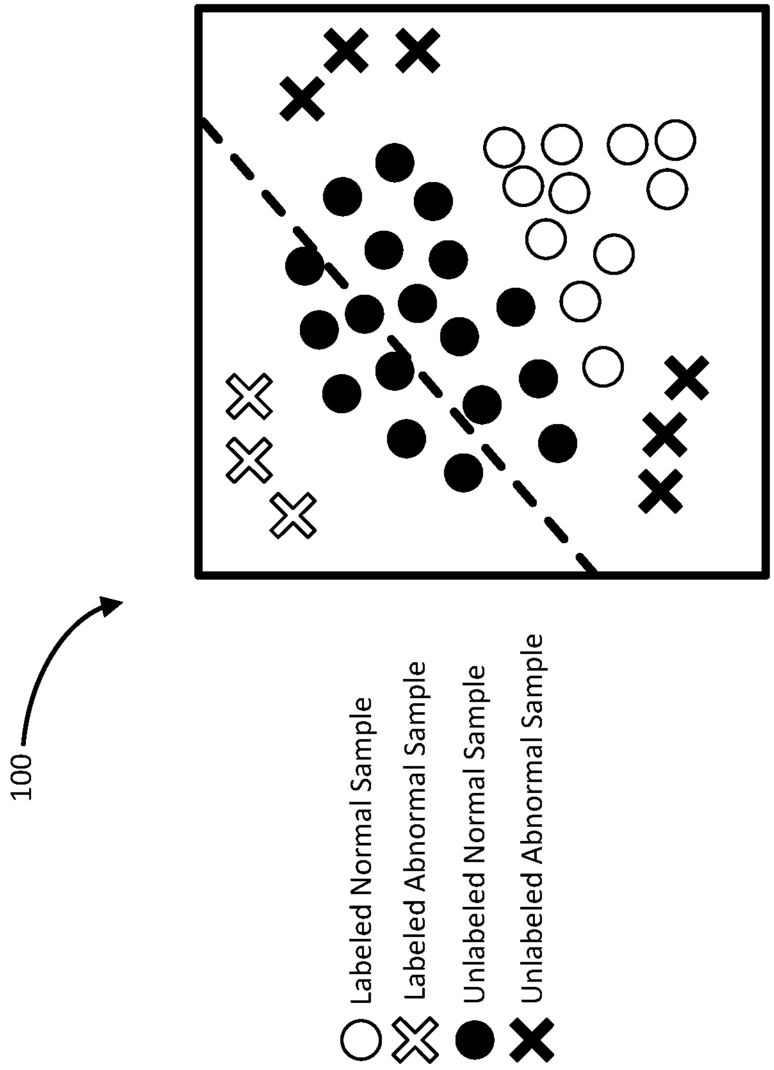
FIG. 2 depicts an example supervised learning approach with labeled data according to aspects of the disclosure.
Figure 3:
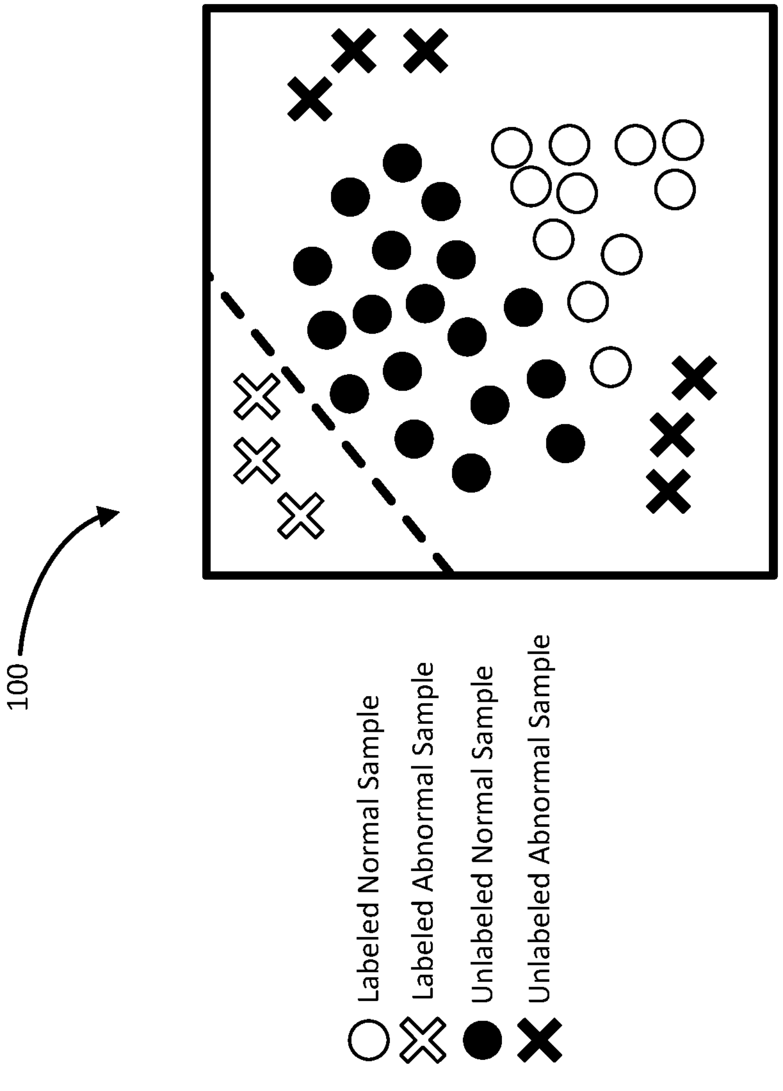
FIG. 3 depicts an example supervised learning approach after treating unlabeled data as normal samples according to aspects of the disclosure.
Figure 4:
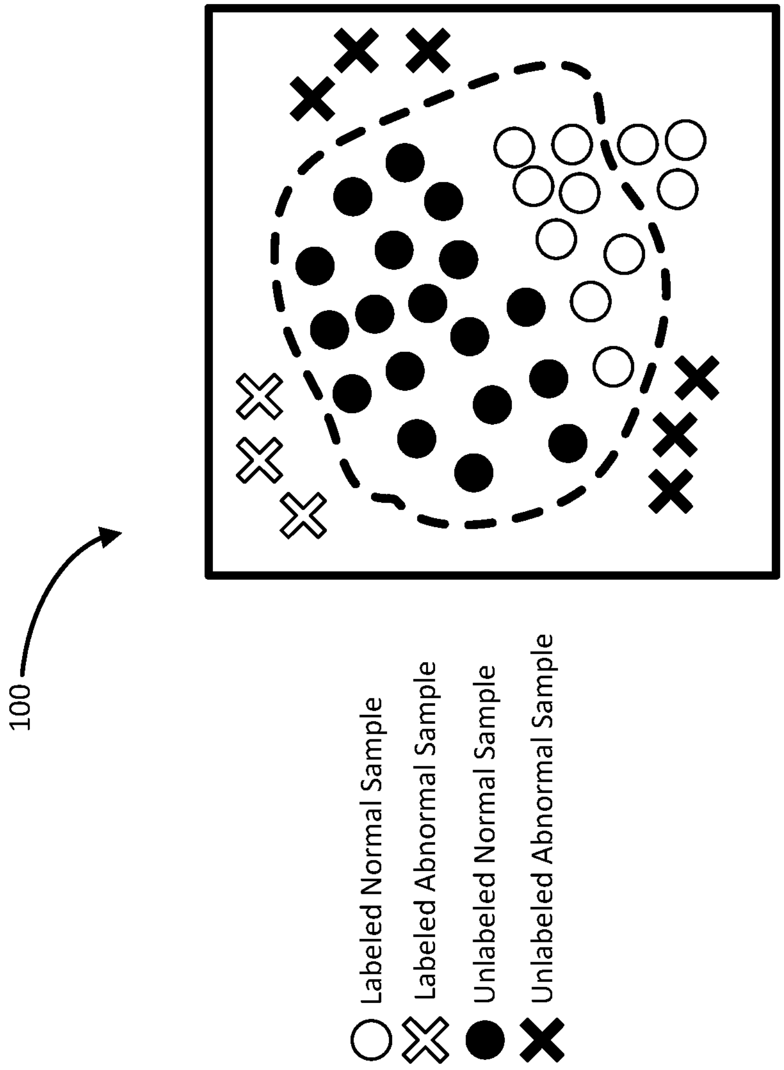
FIG. 4 depicts an example one-class classifier without using labels according to aspects of the disclosure.

SPADE aims to train a binary classifier for normal and anomalous data by iteratively learning from labeled and pseudo-labeled data. As such, SPADE includes a pseudo-labeler to assign binary labels to unlabeled data. Using a trained binary classifier for pseudo-labeling can be sub-optimal for anomaly detection with distribution shift as the decision boundaries of binary classifiers could be highly biased by the small amount of labeled data. FIG. 1 depicts an example data distribution 100 where the labeled and unlabeled data distributions are different. As shown in FIG. 2 and FIG. 3, the bias can have a negative impact when labeled and unlabeled data distributions are mismatched, illustrated by the dashed line representing a decision boundary. Instead, the pseudo-labeler is decoupled from a trained binary classifier and built with one-class classifiers (OCCs). While this may not utilize the labeled positive data like binary classifiers, it can prevent overfitting to the small amount of labeled data, and thus can be more robust to distribution shifts, as shown in FIG. 4.

Figure 5:
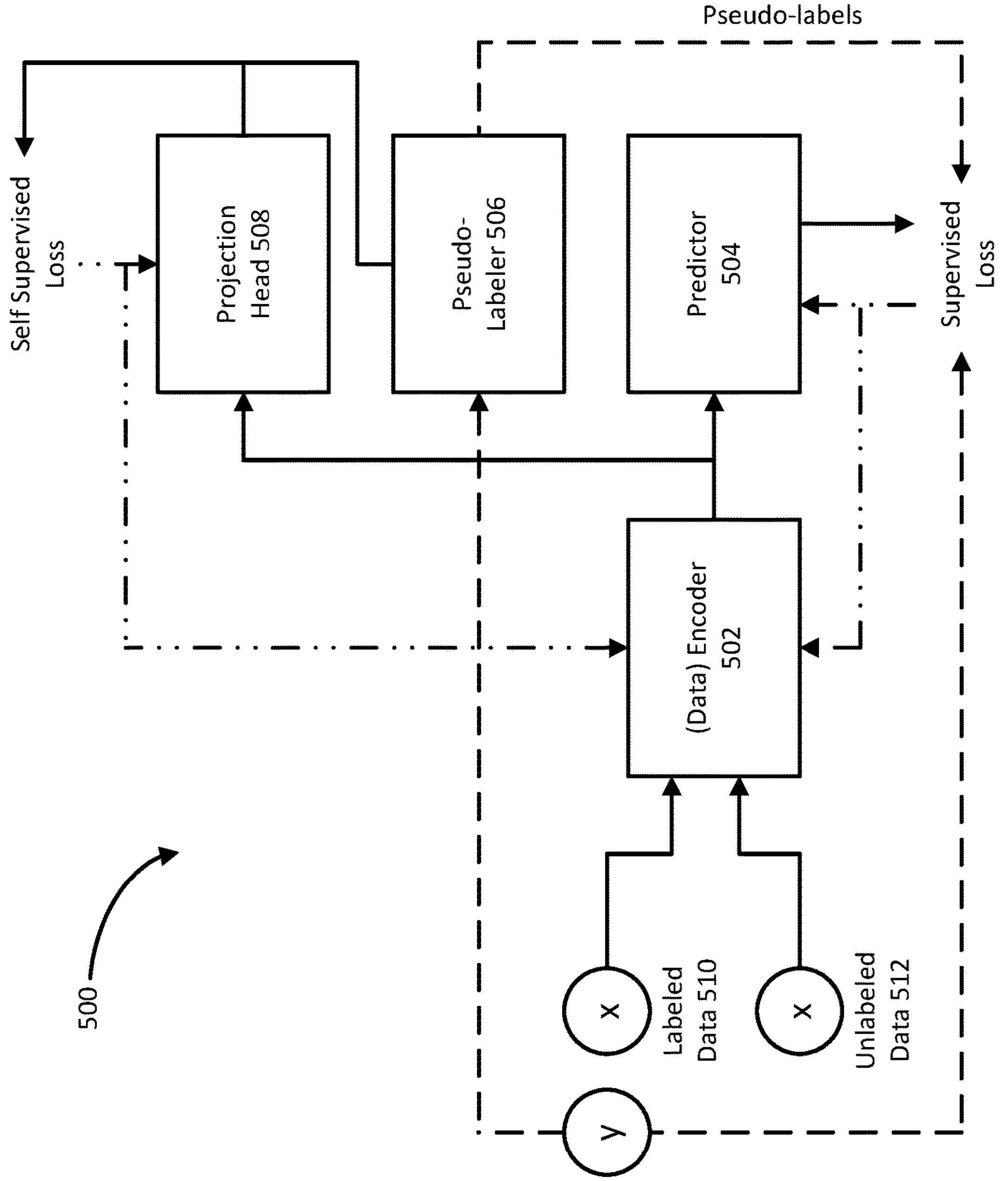
FIG. 5 depicts a block diagram of an example SPADE framework according to aspects of the disclosure.

FIG. 5 depicts a block diagram of an example framework 500 for SPADE, which includes an encoder 502, a predictor 504, a pseudo-labeler 506, and a projection head 508. The encoder 502 $X \rightarrow H$, which can be a data encoder, can map input features x into latent representations $r=h(x)$. The input features can include labeled data 510 and unlabeled data 512. Any machine learning model architecture can be employed for the encoder 502. For example, a multi-layer perceptron (MLP) can be employed for tabular data, or a convolutional neural network (CNN) can be employed for image data. The predictor 504 $H \rightarrow Y$ can utilize the learned representations r to output anomaly scores $q(r)$. The anomaly scores can be determined by the encoder 502 and predictor 504 as $q(h(x))$. The pseudo-labeler 506 and projection head 508 can help the encoder 502 and predictor 504 with training. The pseudo-labeler 506 $H \rightarrow \{0, 1, -1\}$ can determine the pseudo-labels of unlabeled data $x^u$ using an ensemble of OCCs. $v(h(x^u))=1/0/-1$ can represent pseudo-anomalous/pseudo-normal/unlabeled. The predictor 504 can utilize the labeled data and unlabeled data with $v(h(x^u))=1/0$ for training. The projection head 508 $H \rightarrow G$ can help representation learning of the encoder 502. Any representation learning method can be utilized, such as contrastive learning or pretext task predictions. The projection head 508 can be configured for self-supervised learning. For example, if reconstruction is used as a pretext task of self-supervised learning, the projection head 508 can be used to decode raw features from the representations output from the encoder 502. The projection head 508 can be utilized to achieve more meaningful representations for use by the pseudo-labeler 506 and predictor 504.

Figure 6:
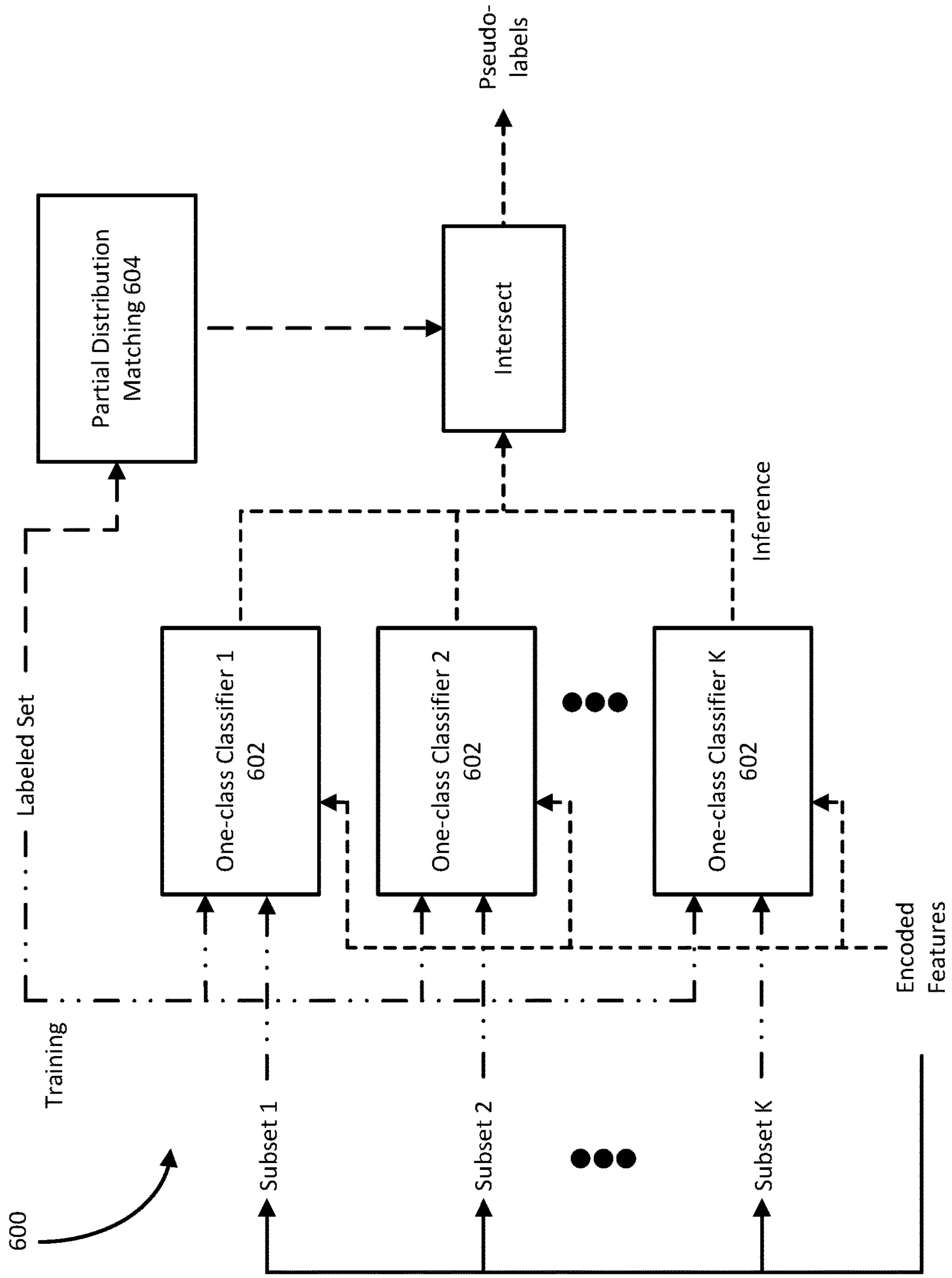
FIG. 6 depicts a block diagram of an example pseudo-labeler according to aspects of the disclosure.

FIG. 6 depicts a block diagram of an example pseudo-labeler 600. The pseudo-labeler 600 can correspond to the pseudo-labeler 506 as depicted in FIG. 5. The pseudo-labeler 600 can include an ensemble of K OCCs ($o_1, o_2, \ldots, o_K$) 602. Each OCC 602 can be trained with negative labeled data $$(D_0^l)$$

and one of K disjoint subsets of unlabeled data $$(D_1^u, D_2^u, \ldots, D_K^u).$$

$o_K(x)$ can output the anomaly scores of x. Positive pseudo-labels, such as anomalous predictions, can be assigned to unlabeled data samples if a threshold amount, such as greater than 50%, of the OCCs 602 agree on them. Negative pseudo-labels, such as normal predictions, can be assigned to unlabeled data samples if a threshold amount, such as greater than 50%, of the OCCs 602 agree on them. Unlabeled data samples can remain unlabeled if a threshold amount, such as at least two of the OCCs, do not agree on whether to label the sample positive or negative.

For example, positive pseudo-labels can be assigned to unlabeled data samples if all OCCs 602 agree on them:

$$v(h(x^u)) = 1 \text{ if } \prod_{k=1}^{K} \hat{y}_k^{pu} = 1$$

where $$\hat{y}_k^{pu} = \{1 \text{ if } o_K(h(x^u)) > \eta_k^p \; 0 \text{ otherwise.} \quad (1)$$

Similarly, a negative pseudo-label can be assigned if all OCCs 602 agree on them:

$$v(h(x^u)) = 0 \text{ if } \prod_{k=1}^{K} \hat{y}_k^{nu} = 1$$

where $$\hat{y}_k^{nu} = \{1 \text{ if } o_K(h(x^u)) < \eta_k^n \; 0 \text{ otherwise.} \quad (2)$$

Unlabeled data without consensus can be annotated as unknown: $v(h(x^u)) = -1$ if $$\prod_{k=1}^{K} \hat{y}_k^{pu} \times \hat{y}_k^{nu} = 0.$$

Thresholds $\eta^p$ and $\eta^n$ can correspond to parameters for converting the continuous values output from the OCCs 602 into binary values for determining the pseudo-label. These parameters can be determined without sacrificing labeled data for validation by adapting partial distribution matching 604. The partial distribution matching 604 can estimate a marginal distribution of unlabeled data by matching the distribution to a known one-class distribution, e.g., positive or negative. Essentially, normal samples can be closer to other normal samples and anomalous samples can be closer to other anomalous samples. The partial distribution matching 604 can match the distribution of anomaly scores of positively labeled data to that of unlabeled data to estimate their marginal distribution and determine $\eta^p$ accordingly. Similarly, the partial distribution matching 604 can match the distribution of anomaly score of negatively labeled data to that of unlabeled data to estimate their marginal distribution and determine Tin accordingly. Example formulations for $\eta^p$ and $\eta^n$ are below:

$$\eta_k^p = \text{argarg} D_w(\{o_K(h(x^l)) \mid y^l = 1\}, \{o_K(h(x^u)) > \eta\}) \quad (3)$$

$$\eta_k^n = \text{argarg} D_w(\{o_K(h(x^l)) \mid y^l = 0\}, \{o_K(h(x^u)) < \eta\}) \quad (4)$$

where $D_w$ is a Wasserstein distance between two distributions. Subsets of the unlabeled data can be determined for pseudo-labeling whose Wasserstein distance from labeled data is a minimum.

In some semi-supervised settings, such as positive and unlabeled (PU) and negative and unlabeled (NU) settings, only one class of labeled samples are available. In these settings, Otsu's method can be employed to identify a threshold of the class without labeled samples. With Otsu's method, the threshold that minimizes intra-class anomaly score variances can be determined in an unsupervised way. For example, in a PU setting, $\eta^p$ can be set using EQ. (3) and $\eta^n$.

An anomaly detection model q(h(•)), such as the predictor 504, can be trained using loss functions, such as binary cross entropy (BCE) on labeled data, BCE on pseudo-labeled data, and self-supervised loss on all data. A self-supervised module g, such as the decoder 502 for reconstruction loss or the projection head 508 for contrastive loss, can be jointly trained with an auxiliary self-supervised loss.

For example, the BCE loss on the labeled data can be formulated as $L_{Y^l} = E[L_{BCE}(q(h(x^l)), y^l)]$, and the BCE loss on pseudo-labeled data can be formulated as $L_{Y^u} = E[L_{BCE}(q(h(x^u)), v(h(x^u))) \times I\{v^u \in \{0, 1\}\}]$. Here, instead of subsampling unlabeled data with known pseudo-labels, a binary weight $I\{v^u \in \{0, 1\}\}$ is assigned to each unlabeled sample so that the loss contribution from pseudo-labeled data can be controlled based on the quality of the anomaly detection model.

To improve the quality of the encoder 502, auxiliary self-supervised losses can be utilized with various pretext tasks depending on the real-world application domain. For example, the auxiliary self-supervised losses can include a reconstructive objective, such as $L_R = E[L_{MSE}(x, g(h(x))))]$, or more specific objectives to data type, such as contrastive learning for image data.

Overall, the encoder 502 (*h*), predictor 504 (*q*), and self-supervised module 508 (*g*) can be trained by solving the following optimization problem:

$$h^*, g^*, q^* = \text{arg arg}[L_{Y^l} + \alpha L_{Y^u} + \beta L_R] \quad (5)$$

where α and β are hyperparameters. Training loss can be used for the convergence criteria. For example, if the training loss is converged, e.g., no improvement is observed in the loss for at least 5 epochs, it can be determined that the models are converged as well. The pseudo-labeler 506 can also converge during training.

The benefits of SPADE can be highlighted in various practical settings involving semi-supervised learning with distribution mismatch. To illustrate the benefits, multiple anomaly detection datasets can be considered for image and tabular data types, such as MVTec anomaly detection and Magnetic tile datasets for image data and Covertype, Thyroid, and Drug datasets for tabular data. Further, fraud detection datasets, such as Kaggle credit and Xente, can be utilized to illustrate the benefits of SPADE as well. The datasets can be divided into disjoint train and test data and the training data can be further divided into disjoint labeled and unlabeled data. The labeled and unlabeled data can come from different distributions. AUC can be used as the evaluation metric for SPADE.

Anomalies can evolve over time in many applications. For fraud detection, criminals might invent new fraudulent approaches to trick the existing systems. For manufacturing, a modified process might yield different defects that have been never met before. Therefore, labeled data can become outdated and newly gathered unlabeled data can come from different distributions. Datasets can be constructed with multiple anomaly types to simulate such scenarios. Among multiple anomaly types, subsets of the anomaly types and normal samples can be provided as labeled data and other anomaly types can only appear in unlabeled data. As depicted in the tables in FIG. 7, SPADE can achieve consistently and significantly better performance in AUC metrics overall, given, and missed, demonstrating its generalizability to unseen anomalies. Compared to the best baseline, SPADE can improve overall AUC by 0.106, 0.015, and 0.031 on the three tabular datasets.

Each baseline has its own limitations. Supervised classifiers cannot utilize unlabeled data at all, and negative supervised classifiers suffer from contaminated labeled data for training the predictive model. OCC models are suboptimal as they cannot utilize the anomalous label information. Semi-supervised learning baselines suffer from distribution mismatch between labeled and unlabeled data. For domain adaptation baseline, it shows poor performances with a small number of source samples.

While some samples can be easier to label, other samples can be misleadingly difficult to label because they can appear differently from known cases. To simulate this scenario, datasets can be constructed where the labeled data only includes easy-to-label samples while the unlabeled data includes hard-to-label samples. Logistic regression can be trained using the entire training data and labeled samples can be gathered where confidence of the trained logistic regression outputs is larger than a certain threshold and the predictions are correct.

The easiness section of the bottom table in FIG. 7 and the table in FIG. 8 show that SPADE can achieve superior or similar anomaly detection performances. This constitutes a great potential in reducing labeling costs by allowing skipping of samples that could take too long to correctly label.

With only positive samples as the labeled data and all other samples being unlabeled, e.g., the positive and unlabeled (PU) setting, distributions between labeled, only positive samples, and unlabeled, both positive and negative samples, would be different. Datasets can be constructed with multiple anomaly types to simulate such scenarios. Among multiple anomaly types, subsets of the anomaly types can be provided as labeled data and other anomaly types can only appear in unlabeled data. Normal samples can be excluded from the labeled data to represent the PU setting. The table in FIG. 9 depicts compares the performance of SPADE in the PU setting on multiple tabular datasets. SPADE generalizes better and outperforms with significantly better AUC in missed anomaly types.

SPADE can also be evaluated with real-world fraud detection datasets: Kaggle credit card fraud, 0.17% anomaly ratio with 284807 total samples; and Xente fraud detection, 0.20% anomaly ratio with 95662 total samples. Here, anomalies can be evolving, e.g., their distributions change over time. To catch evolving anomalies, the anomaly detection model needs to be retrained based on labeling for new anomalies, which can be costly and time consuming. SPADE can improve anomaly detection performance using both labeled data and newly gathered data, even without additional labeling.

Training and test data can be split based on measurement time. The later samples can be included in the testing data, which can be about 50%, and earlier samples can be included in the training data, which can be about 50%. The training data can be further divided into labeled and unlabeled data. Earlier acquired data can be included in the labeled data, which can be about 5-20% while later acquired data can be included in the unlabeled data, which can be about 80-95%. AUC can be used as the anomaly detection metric. As shown in the table in FIG. 10, SPADE can consistently outperform for different labeling ratio values on both fraud datasets, taking advantage of unlabeled data and showing robustness to evolving distributions.

Figure 11:
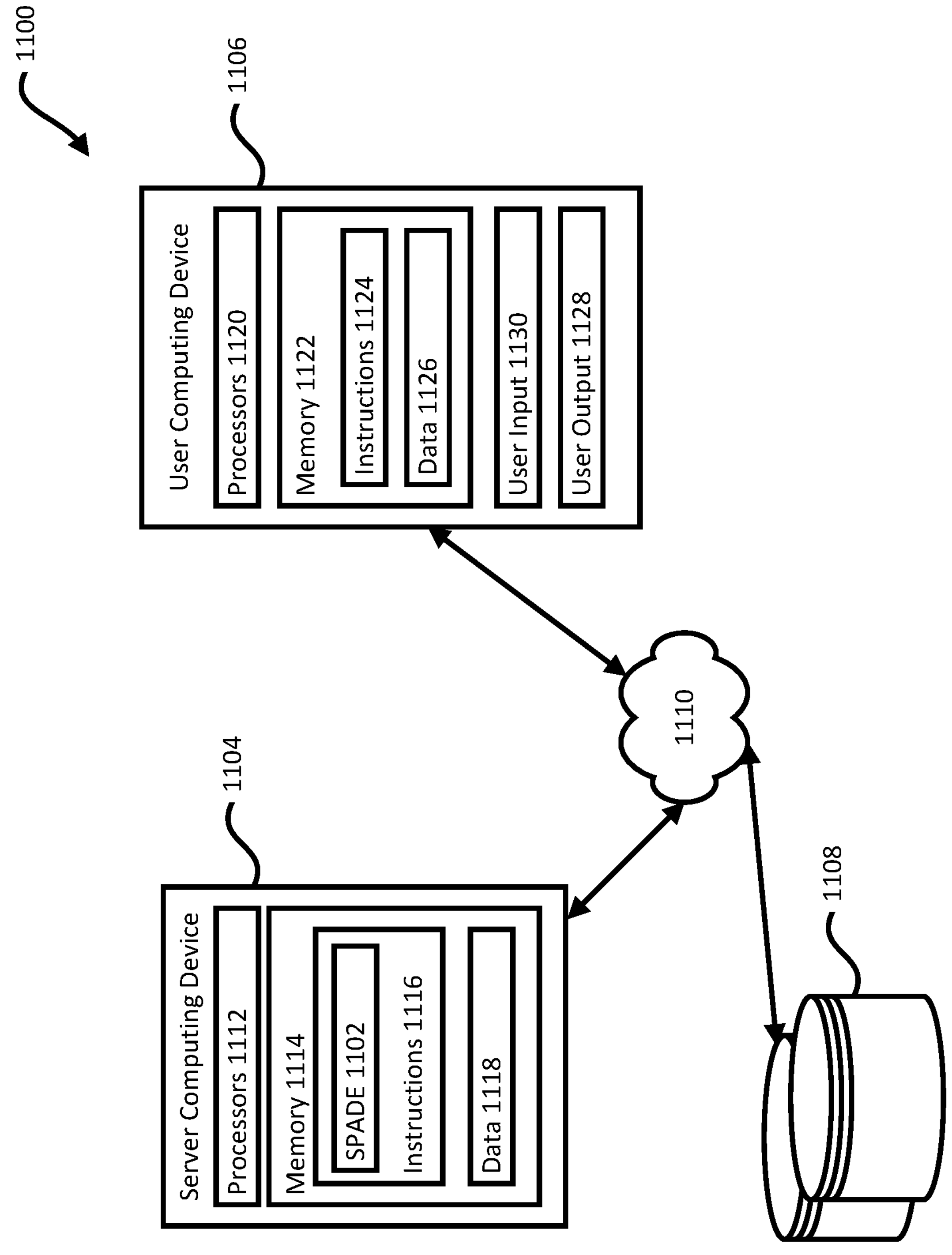
FIG. 11 depicts a block of an example environment for SPADE according to aspects of the disclosure.

FIG. 11 depicts a block diagram of an example computing environment 1100 implementing an example SPADE 1102. For example, SPADE 1102 can correspond to the SPADE 500 described in FIG. 5. SPADE 1102 can be implemented on one or more devices having one or more processors in one or more locations, such as in server computing device 1104. User computing device 1106 and the server computing device 1104 can be communicatively coupled to one or more storage devices 1108 over a network 1110. The storage devices 1108 can be a combination of volatile and non-volatile memory and can be at the same or different physical locations than the computing devices 1104, 1106. For example, the storage devices 1108 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 1104 can include one or more processors 1112 and memory 1114. The memory 1114 can store information accessible by the processors 1112, including instructions 1116 that can be executed by the processors 1112. The memory 1114 can also include data 1118 that can be retrieved, manipulated, or stored by the processor 1112. The memory 1114 can be a type of transitory or non-transitory computer readable medium capable of storing information accessible by the processors 1112, such as volatile and non-volatile memory. The processors 1112 can include one or more central processing units (CPUs), graphic processing units (GPUs), field-programmable gate arrays (FPGAs), and/or application-specific integrated circuits (ASICs), such as tensor processing units (TPUs).

The instructions 1116 can include one or more instructions that when executed by the processors 1112, cause the one or more processors 1112 to perform actions defined by the instructions 1116. The instructions 1116 can be stored in object code format for direct processing by the processors 1112, or in other formats including interpretable scripts or collections of independent source code modules that are interpreted on demand or compiled in advance. The instructions 1116 can include instructions for implementing processes consistent with aspects of this disclosure. Such processes can be executed using the processors 1112, and/or using other processors remotely located from the server computing device 1104.

The data 1118 can be retrieved, stored, or modified by the processors 1112 in accordance with the instructions 1116.

The data 1118 can be stored in computer registers, in a relational or non-relational database as a table having a plurality of different fields and records, or as JSON, YAML, proto, or XML documents. The data 1118 can also be formatted in a computer-readable format such as, but not limited to, binary values, ASCII or Unicode. Moreover, the data 1118 can include information sufficient to identify relevant information, such as numbers, descriptive text, proprietary codes, pointers, references to data stored in other memories, including other network locations, or information that is used by a function to calculate relevant data.

The user computing device 1106 can also be configured similar to the server computing device 1104, with one or more processors 1120, memory 1122, instructions 1124, and data 1126. The user computing device 1106 can also include a user output 1128, and a user input 1130. The user input 1130 can include any appropriate mechanism or technique for receiving input from a user, such as keyboard, mouse, mechanical actuators, soft actuators, touchscreens, microphones, and sensors.

The server computing device 1104 can be configured to transmit data to the user computing device 1106, and the user computing device 1106 can be configured to display at least a portion of the received data on a display implemented as part of the user output 1128. The user output 1128 can also be used for displaying an interface between the user computing device 1106 and the server computing device 1104. The user output 1128 can alternatively or additionally include one or more speakers, transducers or other audio outputs, a haptic interface or other tactile feedback that provides non-visual and non-audible information to the platform user of the user computing device 1106.

Although FIG. 6 illustrates the processors 1112, 1120 and the memories 1114, 1122 as being within the computing devices 1104, 1106, components described in this specification, including the processors 1112, 1120 and the memories 1114, 1122 can include multiple processors and memories that can operate in different physical locations and not within the same computing device. For example, some of the instructions 1116, 1124 and the data 1118, 1126 can be stored on a removable SD card and others within a read-only computer chip. Some or all of the instructions 1116, 1124 and data 1118, 1126 can be stored in a location physically remote from, yet still accessible by, the processors 1112, 1120. Similarly, the processors 1112, 1120 can include a collection of processors that can perform concurrent and/or sequential operation. The computing devices 1104, 1106 can each include one or more internal clocks providing timing information, which can be used for time measurement for operations and programs run by the computing devices 1104, 1106.

The server computing device 1104 can be configured to receive requests to process data from the user computing device 1106. For example, the environment 110 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 1106 may receive and transmit data specifying target computing resources to be allocated for executing a machine learning model trained to perform a particular machine learning task.

The computing devices 1104, 1106 can be capable of direct and indirect communication over the network 1110. The computing devices 1104, 1106 can set up listening sockets that may accept an initiating connection for sending and receiving information. The network 1110 itself can include various configurations and protocols including the Internet, World Wide Web, intranets, virtual private networks, wide area networks, local networks, and private networks using communication protocols proprietary to one or more companies. The network 1110 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 1110, in addition or alternatively, can also support wired connections between the computing devices 1104, 1106, including over various types of Ethernet connection.

Although a single server computing device 1104 and user computing device 1106 are shown in FIG. 11, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

As such, generally disclosed herein are implementations for a framework, SPADE, which combines supervised and self-supervised learning using a pseudo-labeling mechanism with an ensemble of OCCs. Further, SPADE includes an approach to pick hyperparameters without a validation set, a crucial component for data-efficient anomaly detection. Overall, SPADE can consistently outperform alternatives in various scenarios. AUC improvements with SPADE can be up to 10.6% on tabular data and 3.6% on image data.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems. One or more processors in one or more locations implementing an example SPADE according to aspects of the disclosure can perform the operations shown in the drawings and recited in the claims.

Unless otherwise stated, the examples described herein are not mutually exclusive, but may be implemented in various combinations to achieve unique advantages. As these and other variations and combinations of the features discussed above can be utilized without departing from the subject matter defined by the claims, the description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method to train a binary classifier for anomaly detection, the method comprising:

receiving, by one or more processors, unlabeled training data comprising data samples associated with anomaly detection;

generating, by the one or more processors, pseudo labels for the unlabeled training data using a plurality of one-class classifiers, wherein a positive pseudo label is generated for a first unlabeled data sample of the unlabeled training data based on a threshold amount of the one-class classifiers indicating the first unlabeled data sample is anomalous and a negative pseudo label is generated for a second unlabeled data sample of the unlabeled training data based on the threshold amount of the one-class classifiers indicating the second unlabeled data sample is normal;

assigning, by the one or more processors, the pseudo labels respectively to the data samples of the unlabeled training data to generate pseudo labeled training data; and training, by the one or more processors, the binary classifier to detect network anomalies based on minimizing a loss function that assigns a binary weight to each of the data samples of the pseudo labeled training data.

2. The method of claim 1, wherein each of the one-class classifiers are trained with negatively labeled training data and a disjoint subset of unlabeled training data.

3. The method of claim 1, wherein the threshold amount is all of the one-class classifiers indicating an unlabeled data sample is anomalous or normal.

4. The method of claim 3, wherein an unlabeled pseudo label is generated for a third unlabeled data sample of the unlabeled training data based on at least one of the one-class classifiers indicating the third unlabeled data sample is anomalous and at least one other of the one-classifiers indicating the third unlabeled data sample is normal.

5. The method of claim 1, further comprising encoding, by the one or more processors, the unlabeled training data into latent representations.

6. The method of claim 1, further comprising receiving, by the one or more processors, labeled training data comprising data samples associated with anomaly detection that are labeled as anomalous or normal.

7. The method of claim 6, wherein training the binary classifier further comprises training the binary classifier to detect network anomalies based on minimizing a loss function with the labeled training data.

8. The method of claim 1, wherein generating the pseudo labels further comprises:

matching a distribution of anomaly scores of positively pseudo labeled data to anomaly scores of the unlabeled training data;

estimating a positive marginal distribution; and determining a parameter for generating positive pseudo labels based on the positive marginal distribution.

9. The method of claim 1, wherein determining the pseudo labels further comprises:

matching a distribution of anomaly scores of negatively pseudo labeled data to anomaly scores of the unlabeled training data;

estimating a negative marginal distribution; and determining a parameter for generating negative pseudo labels based on the negative marginal distribution.

10. The method of claim 1, wherein the loss function comprises binary cross entropy loss.

11. A system comprising:

one or more processors; and one or more storage devices coupled to the one or more processors and storing instructions that, when executed by the one or more processors, cause the one or more processors to perform operations to train a binary classifier for anomaly detection, the operations comprising:

receiving unlabeled training data comprising data samples associated with anomaly detection;

generating pseudo labels for the unlabeled training data using a plurality of one-class classifiers, wherein a positive pseudo label is generated for a first unlabeled data sample of the unlabeled training data based on a threshold amount of the one-class classifiers indicating the first unlabeled data sample is anomalous and a negative pseudo label is generated for a second unlabeled data sample of the unlabeled training data based on the threshold amount of the one-class classifiers indicating the second unlabeled data sample is normal;

assigning the pseudo labels respectively to the data samples of the unlabeled training data to generate pseudo labeled training data; and training the binary classifier to detect network anomalies based on minimizing a loss function that assigns a binary weight to each of the data samples of the pseudo labeled training data.

12. The system of claim 11, wherein:

each of the one-class classifiers are trained with negatively labeled training data and a disjoint subset of unlabeled training data;

the threshold amount is all of the one-class classifiers indicating an unlabeled data sample is anomalous or normal; and an unlabeled pseudo label is generated for a third unlabeled data sample of the unlabeled training data based on at least one of the one-class classifiers indicating the third unlabeled data sample is anomalous and at least one other of the one-classifiers indicating the third unlabeled data sample is normal.

13. The system of claim 11, wherein:

the operations further comprise receiving labeled training data comprising data samples associated with anomaly detection that are labeled as anomalous or normal; and training the binary classifier further comprises training the binary classifier to detect network anomalies based on minimizing a loss function with the labeled training data.

14. The system of claim 11, wherein generating the pseudo labels further comprises:

matching a distribution of anomaly scores of positively labeled data to anomaly scores of the unlabeled training data;

estimating a positive marginal distribution;

determining a parameter for generating positive pseudo labels based on the positive marginal distribution;

matching a distribution of anomaly scores of negatively labeled data to anomaly scores of the unlabeled training data;

estimating a negative marginal distribution; and determining a parameter for generating negative pseudo labels based on the negative marginal distribution.

15. The system of claim 11, wherein the loss function comprises binary cross entropy loss.

16. A non-transitory computer readable medium for storing instructions that, when executed by one or more processors, cause the one or more processors to perform operations to train a binary classifier for anomaly detection, the operations comprising:

receiving unlabeled training data comprising data samples associated with anomaly detection;

generating pseudo labels for the unlabeled training data using a plurality of one-class classifiers, wherein a positive pseudo label is generated for a first unlabeled data sample of the unlabeled training data based on a threshold amount of the one-class classifiers indicating the first unlabeled data sample is anomalous and a negative pseudo label is generated for a second unlabeled data sample of the unlabeled training data based on the threshold amount of the one-class classifiers indicating the second unlabeled data sample is normal;

assigning the pseudo labels respectively to the data samples of the unlabeled training data to generate pseudo labeled training data; and training the binary classifier to detect network anomalies based on minimizing a loss function that assigns a binary weight to each of the data samples of the pseudo labeled training data.

17. The non-transitory computer readable medium of claim 16, wherein:

each of the one-class classifiers are trained with negatively labeled training data and a disjoint subset of unlabeled training data;

the threshold amount is all of the one-class classifiers indicating an unlabeled data sample is anomalous or normal; and an unlabeled pseudo label is generated for a third unlabeled data sample of the unlabeled training data based on at least one of the one-class classifiers indicating the third unlabeled data sample is anomalous and at least one other of the one-classifiers indicating the third unlabeled data sample is normal.

18. The non-transitory computer readable medium of claim 16, wherein:

the operations further comprise receiving labeled training data comprising data samples associated with anomaly detection that are labeled as anomalous or normal; and training the binary classifier further comprises training the binary classifier to detect network anomalies based on minimizing a loss function with the labeled training data.

19. The non-transitory computer readable medium of claim 16, wherein determining the pseudo labels further comprises:

matching a distribution of anomaly scores of positively labeled data to anomaly scores of the unlabeled training data;

estimating a positive marginal distribution;

determining a parameter for generating positive pseudo labels based on the positive marginal distribution;

matching a distribution of anomaly scores of negatively labeled data to anomaly scores of the unlabeled training data;

estimating a negative marginal distribution; and determining a parameter for generating negative pseudo labels based on the negative marginal distribution.

20. The non-transitory computer readable medium of claim 16, wherein the loss function comprises binary cross entropy loss.

* * * * *